(12) United States Patent
Moore et al.

(10) Patent No.: US 9,229,837 B1
(45) Date of Patent: Jan. 5, 2016

(54) SENSOR ARRAY EVALUATION TOOL AND METHOD

(71) Applicants: Ryan T. Moore, Newport, RI (US);
David J. Blue, Framingham, MA (US);
Bonnie E. Wardle, Mystic, CT (US);
Rick H. Charette, Narragansett, RI (US)

(72) Inventors: Ryan T. Moore, Newport, RI (US);
David J. Blue, Framingham, MA (US);
Bonnie E. Wardle, Mystic, CT (US);
Rick H. Charette, Narragansett, RI (US)

(73) Assignee: The United States of America as represented by the Secretary of the Navy, Washington, DC (US)

( * ) Notice: Subject to any disclaimer, the term of this patent is extended or adjusted under 35 U.S.C. 154(b) by 486 days.

(21) Appl. No.: 13/749,106

(22) Filed: Jan. 24, 2013

(51) Int. Cl.
*G06F 11/07* (2006.01)
*G06F 11/32* (2006.01)

(52) U.S. Cl.
CPC .................................... *G06F 11/321* (2013.01)

(58) Field of Classification Search
CPC ........... G05B 15/02; G05B 2219/2642; G06Q 30/0283; G06Q 50/06; H02J 13/0062; H02J 13/001; G06F 17/5004; G06F 11/079; Y02B 70/3216; Y02B 90/2638; Y02B 70/3241; Y04S 20/221; Y04S 50/14; Y04S 20/227; Y04S 40/124
USPC ............. 702/56, 183; 700/276; 600/347, 365; 714/39
See application file for complete search history.

(56) References Cited

U.S. PATENT DOCUMENTS

| | | | | |
|---|---|---|---|---|
| 8,224,415 | B2 * | 7/2012 | Budiman | 600/347 |
| 8,731,724 | B2 * | 5/2014 | Drees et al. | 700/276 |
| 8,990,033 | B2 * | 3/2015 | Friedlander et al. | 702/56 |
| 2010/0191085 | A1 * | 7/2010 | Budiman | 600/365 |
| 2012/0022700 | A1 * | 1/2012 | Drees et al. | 700/276 |
| 2014/0245071 | A1 * | 8/2014 | Drees et al. | 714/39 |

* cited by examiner

*Primary Examiner* — Carol S Tsai
(74) *Attorney, Agent, or Firm* — James M. Kasischke; Michael P. Stanley

(57) ABSTRACT

A method for evaluating a sensor array includes providing software having the sensor array topology, relating array elements to hardware components. Data from the array elements is collected and evaluated to determine operative components. Displays of the determinations are generated allowing a user to diagnose sensor array failures. Other aspects of the invention provide for automatic array failure diagnosis and improvement of sensor array directivity. An additional aspect provides a system for evaluating a sensor array incorporating a computer with a database and a display.

8 Claims, 5 Drawing Sheets

Figure 3:
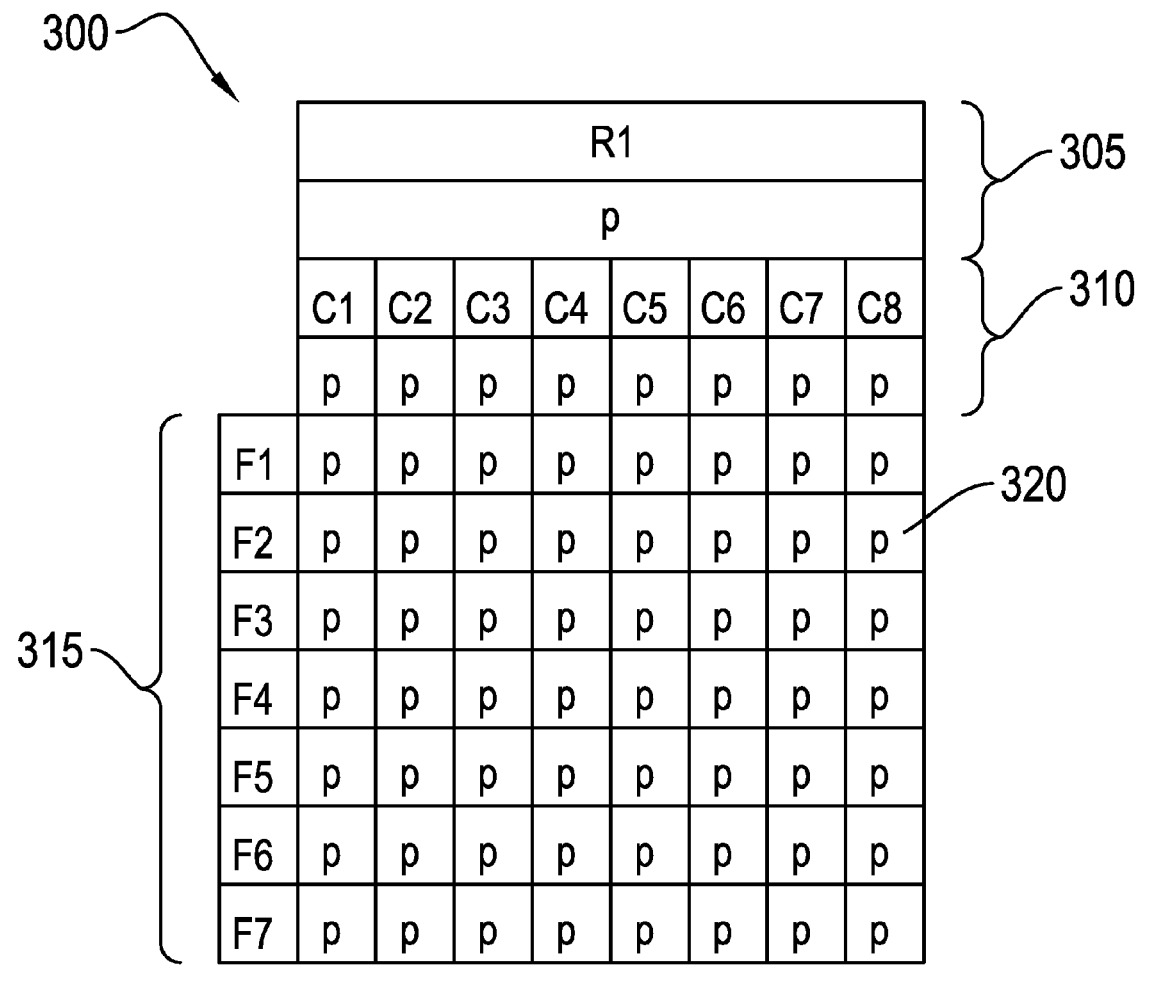

| R1 | | | | | | | |
|---|---|---|---|---|---|---|---|
| p | | | | | | | |
| C1 | C2 | C3 | C4 | C5 | C6 | C7 | C8 |
| p | p | p | p | p | p | p | p |

| | C1 | C2 | C3 | C4 | C5 | C6 | C7 | C8 |
|---|---|---|---|---|---|---|---|---|
| F1 | p | p | p | p | p | p | p | p |
| F2 | p | p | p | p | p | p | p | p |
| F3 | p | p | p | p | p | p | p | p |
| F4 | p | p | p | p | p | p | p | p |
| F5 | p | p | p | p | p | p | p | p |
| F6 | p | p | p | p | p | p | p | p |
| F7 | p | p | p | p | p | p | p | p |

SENSOR ARRAY EVALUATION TOOL AND METHOD

STATEMENT OF GOVERNMENT INTEREST

The invention described herein may be manufactured and used by or for the Government of the United States of America for governmental purposes without the payment of any royalties thereon or therefor.

CROSS REFERENCE TO OTHER PATENT APPLICATIONS

None.

BACKGROUND OF THE INVENTION (1) Field of Invention

The present invention generally relates to methods of maintaining acoustic sensor arrays.

(2) Description of the Prior Art

Diagnosing failures in marine sonar systems is difficult for many reasons. One issue is that these systems operate in a noisy environment where the signal is difficult to separate from other noise. It can be difficult to determine if a sensor is inoperative and causing noise or merely receiving noise. Thus, it is often difficult to know if a sensor is inoperative.

Another issue is created by the complexity of these systems. Some systems feature long lines of fiber optic sensors. These sensors have a plurality of Bragg arrays made into them to reflect light at different frequencies. A plurality of lasers provides light at different frequencies to the sensors. Light reflecting from the sensors is interfered with light provided to a reference loop to give sensor information. This sensor information is converted from optical information to electronic information. The electronic sensor information is often processed in parallel in multiple processing boards. This sensor information can also be provided to a telemetry system to combine multiple streams of information on fewer cables. Many of these components are subject to mechanical deterioration because the system relies on transmission through a fiber optic line deployed from a marine vessel that operates in a harsh environment.

In any case, diagnosing the failing component or components in these types of systems is difficult because failure of one component may appear as failure of multiple components throughout the system.

SUMMARY OF THE INVENTION

One object of the disclosure is to provide a system for diagnosing failures in sonar systems.

Another object is to provide a probable diagnosis of system failure in the presence of environmental noise.

Yet another object is to provide a user with a visualization of probable failures, so the user can diagnose the most likely failure.

Accordingly, in one aspect of the present disclosure, a method for evaluating a sensor array is provided. This includes configuring software with sensor array topology that relates array elements to hardware components. Data from the array elements is collected and evaluated to determine operative components. Displays of the determinations are generated allowing a user to diagnose sensor array failures. Other aspects of the invention provide for automatic array failure diagnosis and improvement of sensor array directivity.

An additional aspect provides a system for evaluating a sensor array incorporating a computer with a database and a display. To evaluate sensor array directivity, an actual directivity index for the sensor array is computed based on a ratio of the number of operative elements to the number of inoperative elements. The user can specify a theoretical directivity index for the sensor array as a highest possible actual directivity index by providing the assumption that all elements are operative. Accuracy of the sensor array can be determined based on the difference between the actual directivity index and the theoretical directivity index. Based on inoperative elements shown in a chart display, the system can determine one of the plurality of hardware components with a highest probability of having failed.

In one other aspect of the present disclosure, a computer program product stored on a non-transitory computer storage medium is configured to associate each of a plurality of hardware components to at least one element of a sensor array. The program generates a chart display that includes data with respect to whether the plurality of hardware components are operational on an average basis for a time frame of interest. The program also calculates an actual directivity index for the sensor array based on a ratio of the number of operative elements to the number of inoperative elements and based on weights associated with the healthy elements and the unhealthy elements. The program allows one to specify a theoretical directivity index for the sensor array as a highest possible actual directivity index and determine an accuracy of the sensor array based on the difference between the actual directivity index and the theoretical directivity index.

In one other aspect of the present disclosure a system comprises a plurality of hardware components including a sensor array with a plurality of elements and a computer. The computer has a computer processor configured to generate a chart display showing whether the plurality of hardware components are operational on an average basis for a time frame of interest. The computer can also calculate an actual directivity index for the sensor array based on a ratio of the number of healthy elements to the number of unhealthy elements and based on weights associated with the healthy elements and unhealthy elements. The computer can also specify a theoretical directivity index for the sensor array as a highest possible actual directivity index. The computer can determine an accuracy of the sensor array based on the difference between the actual directivity index and the theoretical directivity index.

These and other features, aspects and advantages of the present invention will become better understood with reference to the following drawings, description and claims.

BRIEF DESCRIPTION OF THE DRAWINGS

FIG. 3 is a chart display showing functionality of the sensor array of FIG. 1;

FIG. 4 illustrates a chart view of component failures for the sensor array of FIG. 1.

DETAILED DESCRIPTION OF THE INVENTION

The following detailed description is of the contemplated modes of carrying out the invention. The description is not to be taken in a limiting sense, but is made merely for the purpose of illustrating the general principles of the invention, since the scope of the invention is best defined by the appended claims.

The present disclosure relates generally to methods of facilitating the maintenance of sensor arrays. The present disclosure, more specifically, relates to a sensor array evaluation tool and method that may be used to diagnose and repair sensor arrays. Exemplary embodiments disclosed may be helpful in distinguishing between noise and hardware failures, where in some cases, the distinction is not readily identifiable. For example, current products may not feature a combined method to diagnose sensor array failures and repair sensor arrays leaving the diagnoses of each to separate mechanisms.

Figure 1:
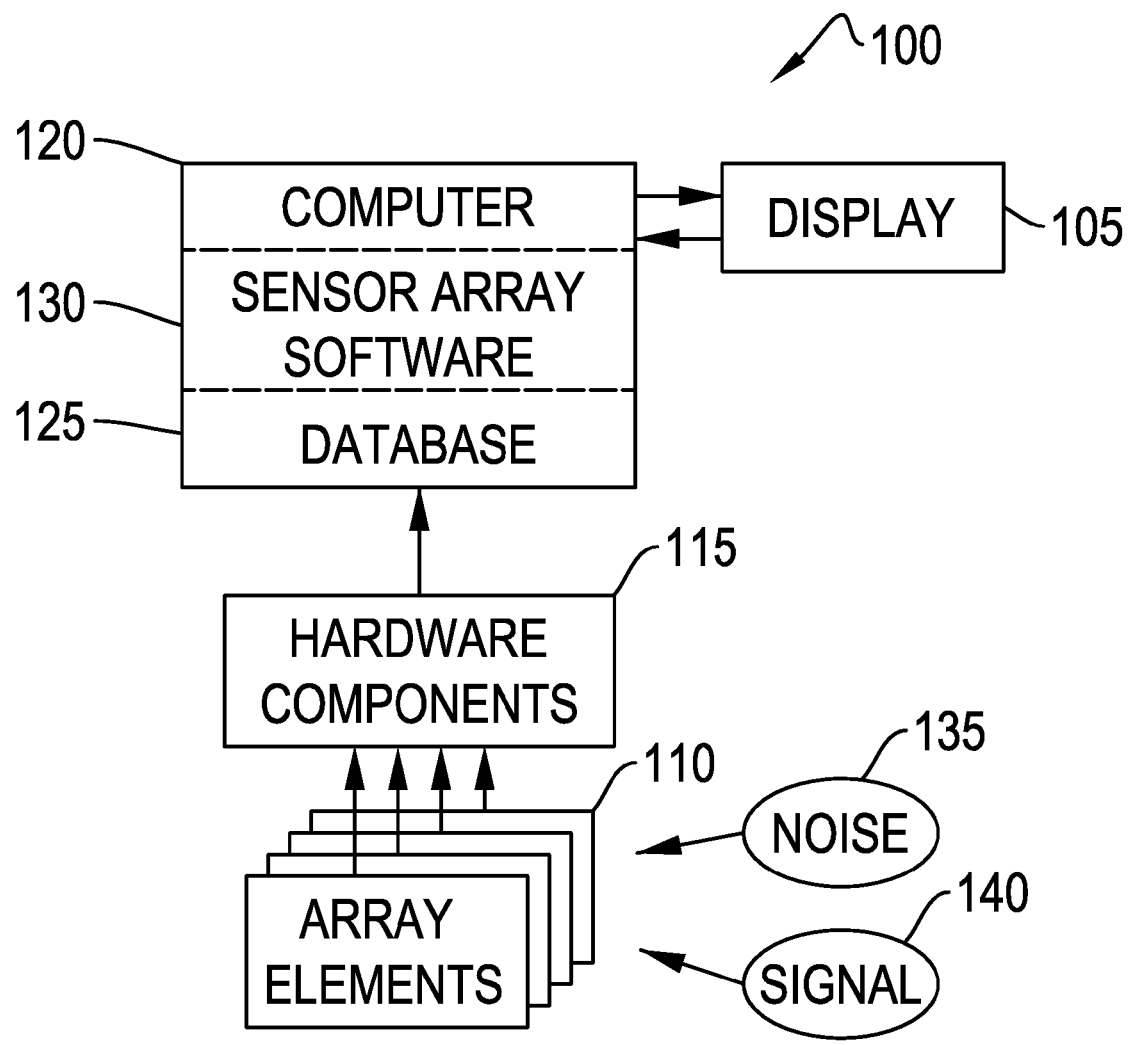
FIG. 1 is a block diagram of a system including a computer connected to a sensor array according to an exemplary embodiment of the present invention.

FIG. 1 shows a block diagram overview of a tool 100 according to an embodiment of the present invention. Tool 100 can be embodied as part of a sonar system or as part of a general purpose computer joined to receive data from a sonar system. A user can select a graphical user interface on a display 105 to evaluate the health of a sensor array having a plurality of array elements 110 joined to hardware components 115. Health of an element of a sensor array may refer to whether an element of the plurality of array elements 110 is operative or inoperative. Inoperative can include conditions in which the element has excessive noise or fails intermittently. A computer system 120 having a database 125 and sensor array software 130 is joined to display 105. Computer system 120 is further joined to receive data from hardware components 115. Sensor diagnostic software 130 has internal data providing the configuration of the array elements and hardware components. This can be programmed for different arrays but is generally tailored to the joined sonar system. Database 125 contains information received from the hardware components. Information in database 125 includes performance over time and average performance. This data includes timing data and sonar data that will allow correlation of sonar data with external events such as location. Computer 120 has sensor array diagnostic software 130 executing commands thereon. Responsive to the diagnostic software 130, computer 120 can query the database 125 and provide a chart showing functioning of the sonar array on display 105. Chart can periodically be stored on database 125 or on some other data storage device. Diagnostic software 130 also has instructions capable of identifying a hardware component failure. Software 130 can also determine the accuracy of the sonar array based on its current condition.

Through the user interface on display 105, the user can identify a time frame of interest, identify a probability of a hardware component 115 functioning, select a display, set array parameters, and select software functions. Displays include an average dental chart, a component diagnosis and a directivity index display. The average dental chart is a positional chart showing sensor functioning, such as that shown in FIG. 5. A component diagnosis indicates the component that is most likely to be responsible for indicated array failures. A directivity index display shows the theoretical directivity of the array and the directivity of the array with the failed components.

In one embodiment, the sensor array is a towed fiber optic sonar sensor array capable of receiving acoustic data. Sensor array charts displayed by software 130 can be divided into several panels. While this software was originally developed for an optical acoustic array, it could also be adapted to an electronic, radio or optical array. Array elements 110 may provide acoustic data to hardware components 115. Hardware components 115 can include, for example, a receiver chassis, lasers, receiver cards, and fibers. Array elements 110 receive environmental sounds including noise 135 and signal 140. Noise 135 can affect the identified status of the array elements 110 of the sensor array. For example, noise 135 can indicate a failure in one of the array elements 110. Noise received at one array element but not at nearby array elements can indicate internal noise which the system 100 should identify as a failure. Likewise, the absence of a signal or external noise at an element can also indicate a failure when the signal or external noise is received by nearby array elements. The sensor array software 130 generates sensor array charts for display 105 that indicate array elements 110 that are indicating a failure condition. These failure conditions can be established using methods known in the art. In the absence of a failure condition, the software can indicate that an array element has passed testing.

Figure 2:
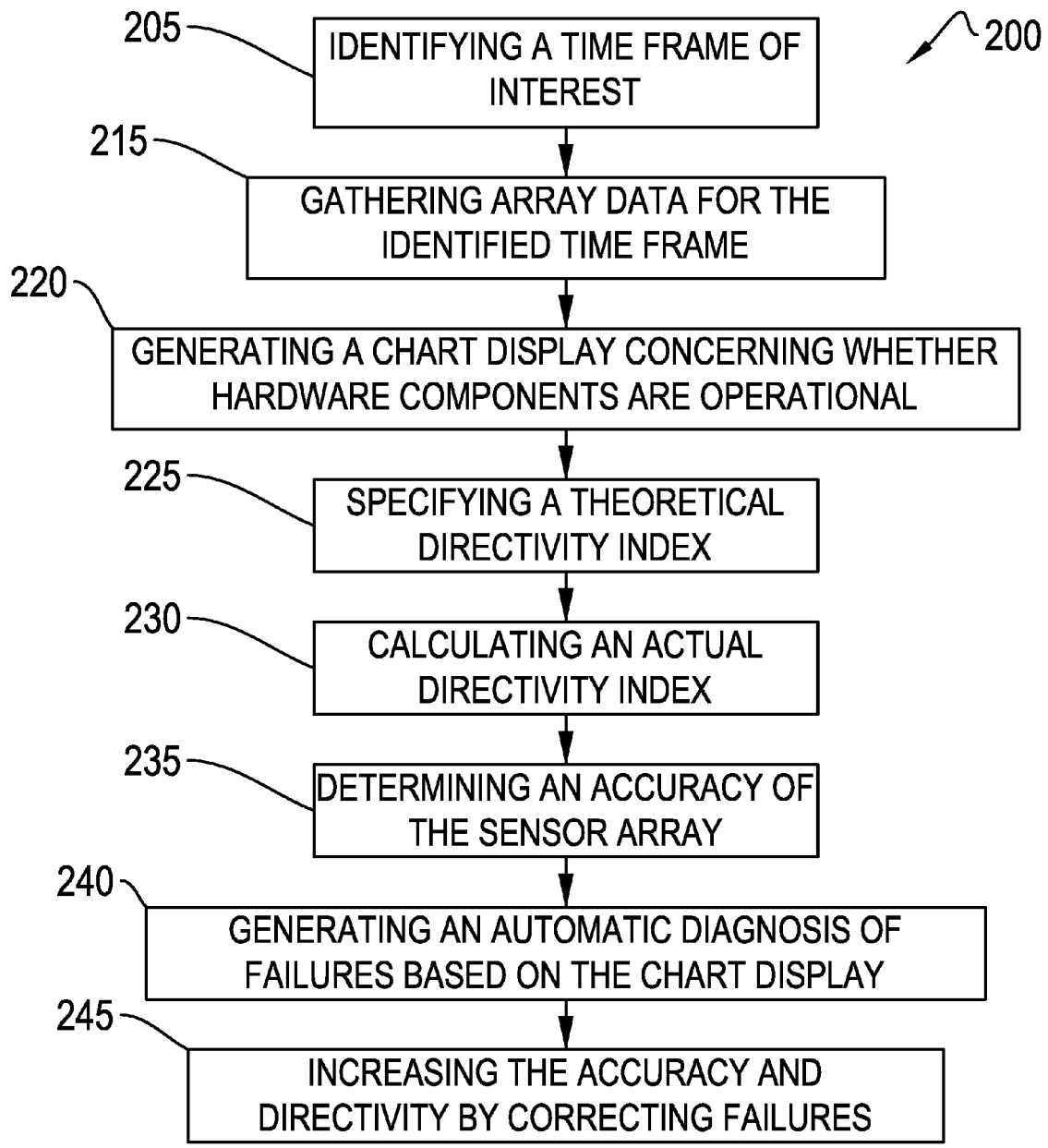
FIG. 2 is a flowchart illustrating a method for evaluating a sensor array according to an exemplary embodiment of the sensor array of FIG. 1.

Referring to FIG. 2, a method 200 of evaluating a sensor array may include a step 205 of identifying a time frame of interest for evaluating the elements 110 of the sensor array. For example, a time frame of interest may include a fixed time period during which a user may desire to evaluate the elements 110 of the sensor array. Step 215 includes gathering array data for the identified time frame. Step 220 includes generating a chart display that includes data with respect to whether hardware components 115 and array elements 110 are operational on an average basis for the time frame of interest. The chart display can be based on a predetermined probability that one of the plurality of hardware components has failed. As an example, an operator can request that components be indicated as failed when there is a given probability (such as 90%) that hardware components failed during a specified time period. The hardware components 115 can, for example, include the receiver chassis, lasers, receiver cards, and fibers.

A step 225 may include specifying a theoretical directivity index for the array elements 110 of the sensor array. As an example, the theoretical directivity index is the highest possible actual directivity index. This is the sum of all weights for all elements because all array elements are assumed to be healthy. An equation that may be used to calculate the theoretical directivity index is as follows: theoretical directivity index=$20*\log(\Sigma W_{eh})-10*\log(\Sigma W_e^2)$; where $W_{eh}$ is the weight associated with each healthy element, and $W_e$ is the weight associated with each element. For example, if there are three elements and the weights are a, b, and c; the theoretical directivity index=$20 \log(a+b+c)-10 \log(a^2+b^2+c^2)$. This tool is not concerned with the actual noise levels in the water but rather with the performance of the array elements. A step 230 may include calculating an actual directivity index for the array elements 110 based on status of elements that is determined based on a ratio of the number of healthy elements to the number of unhealthy elements and based on weights associated with the healthy elements and unhealthy elements. For example, the actual directivity index can be determined based on total noise power to actual power delivered to the sensor array. As an example, the total noise power is the degree of noise received at the elements 110. For example, total noise received by array elements 110 can be affected by speed of the associated vessel, depth of the vessel in water, and external noise. A step 235 may include determining an accuracy of array elements 110 based on the difference between the calculated and theoretical directivity indexes. If the actual directivity index is significantly less than the theoretical directivity index then this may be an indicator that an operator may need to correct issues to increase the actual directivity index. By increasing the actual directivity index of one of the panels of array elements 110, the accuracy of the sensor array may be increased.

A step 240 can include generating an automatic diagnosis of failure hardware components based on values in the chart display. As an example, it may be difficult to distinguish noise from a hardware failure, and the software 130 may review the hardware component performance in database 125 and make an overall diagnosis of hardware failures. Software 130 can estimate whether a failure indicated in the chart display is an actual failure based on the array health while in a quiet environment (without noise). For example, if all the elements of a laser have failed and this affects ten of the array elements of associated with a card in a particular receiver chassis, then the computer may identify that only ten array elements associated with the card have failed while all the array elements associated with the laser have failed. Therefore, the issue may likely reside with the associated laser rather than with the associated card. Such a failure can be identified on display 105 in a chart display with indicia such as a color change, higher intensity, flashing indicator or the like. The non-failing component can be maintained at the standard display or de-emphasized. The automated diagnosis provided in step 240 can also provide an indication whether field repair should be attempted. Some failures can be repaired in the field while other failures must wait until the unit can be repaired at a service facility.

Step 245 may include increasing the accuracy of the sensor array and increasing the actual directivity index by correcting failures in the elements 110 of the sensor array. For example, rather than evaluating noise, it may be calculated whether elements 110 are healthy or not over on average over a specified time frame of interest. Then weights can be established for the elements that are healthy. The elements' 110 established weight may be used to determine the actual directivity index of the array. Background noise can cause the elements to appear failed if, for example, a boat is next to a pier. This may be factored out by generating the average dental chart (chart of element functionality) over a time frame of interest which may be when the boat is at sea (quiet environment).

FIG. 3 illustrates a chart display 300 according to an exemplary embodiment. Different areas of the chart may indicate different hardware failures. In this example, individual sensors are associated with a fiber, a card and a chassis. Area 305 shows the state for an overall chassis, labeled R1, holding a plurality of components. The columns of area 310 shows the states for a plurality of hardware component cards, labeled C1, C2, C3, C4, C5, C6, C7, and C8, associated with the chassis. The rows of area 315 show the state for individual fibers, labeled F1, F2, F3, F4, F5, F6, and F7. Area 320 gives the status for individual array elements. In each of these areas "p" indicates a passing evaluation, and "f" indicates a failing evaluation.

Figure 4:
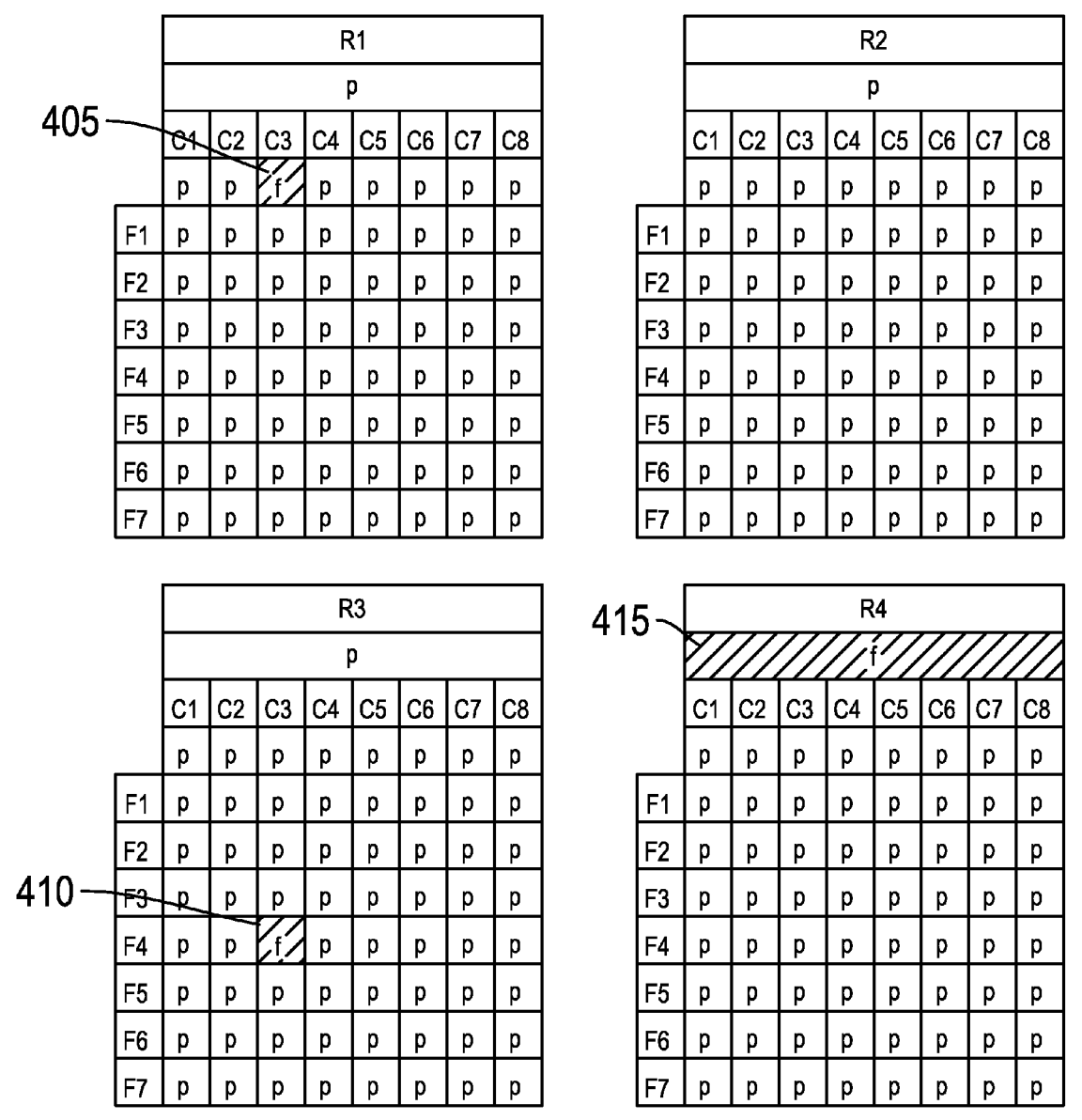

Referring to FIG. 4, there are shown a plurality of chart displays such as that made using the sensor array software 130 and appearing on display 105 of FIG. 1. As above, various forms of indicia can be used to indicate a failure. In the current FIG. a crosshatch and the presence of an "f" are used to indicate failure. As examples, an area showing failure 405 may show, for example, a chassis R1 card C3 failure. An area showing failure 410 may show, for example, a chassis R3, array element failure with the element being located at card C3 on fiber F4. An area showing failure 415 may show, for example, a chassis R4 failure. Chassis R2 has no failures indicated.

Figure 5:
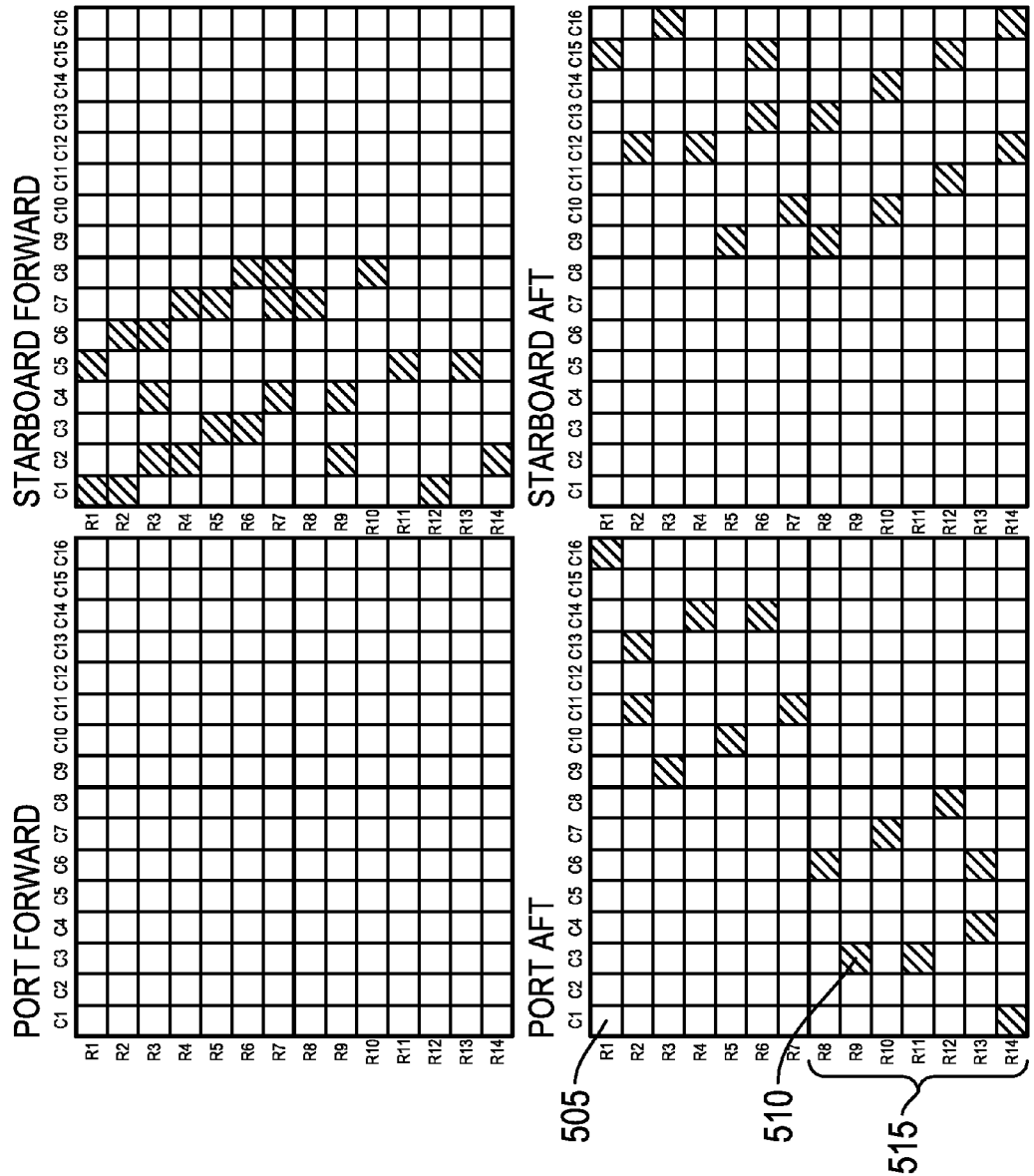
FIG. 5 illustrates a further chart view of component failures for the sensor array of FIG. 1.

Referring to FIG. 5, the FIG. gives an example of a display of array elements over a time of interest 500. The time of interest can be preset or established by the user. This type of display is known as "an average dental chart." The sensor array software allows a user to display sensor conditions by a variety of hardware components such as by card, laser, chassis or location. In the exemplary chart, the sensor array is shown positionally with one quadrant for each portion of the sensor array. Passing array elements are shown with clear cells such as 505 and failing array elements are shown with crosshatched cells 510. A pattern of failed array elements, such as that shown at 515, can indicate that an associated hardware component is failing. Software 130 can match this pattern against preconfigured known failure patterns to give the user a probable diagnosis of the failure. Software 130 can also search different views of failure patterns to determine if one of several different views indicates a failed hardware component.

Software 130 and display 105 also allow a user to simulate a failed hardware component. The user identifies the hardware component to simulate, and software 130 provides a display showing the resulting pattern of array element failures. The user can then compare this simulated failure against the actual system display in order to determine if the actual failure originates in a similar source.

It will be understood that many additional changes in the details, materials, steps and arrangement of parts, which have been herein described and illustrated in order to explain the nature of the invention, may be made by those skilled in the art within the principle and scope of the invention as expressed in the appended claims.

The foregoing description of the preferred embodiments of the invention has been presented for purposes of illustration and description only. It is not intended to be exhaustive nor to limit the invention to the precise form disclosed; and obviously many modifications and variations are possible in light of the above teaching. Such modifications and variations that may be apparent to a person skilled in the art are intended to be included within the scope of this invention as defined by the accompanying claims.

What is claimed is:

1. A method for evaluating a sensor array on a computer comprising:

configuring software with associated sensor array topology relating a plurality of array elements to a plurality of hardware components;

collecting data from a plurality of array elements of the sensor array over a time frame of interest;

evaluating the collected data to determine whether each array element is operative;

generating a first chart display that displays determinations whether each array element is operative in the time frame of interest;

generating additional chart displays by a computer processor showing the relationship between the plurality of array elements and the plurality of hardware components and determinations whether each array element is operative in the time frame of interest, said additional chart displays allowing evaluation of the sensor array by a user;

calculating an actual directivity index for the sensor array based on a ratio of the number of operative array elements to the number of non-operative elements and based on weights associated with the operative elements and the non-operative elements;

specifying a theoretical directivity index for the sensor array as a highest possible actual directivity index; and determining an accuracy of the sensor array based on the difference between the actual directivity index and the theoretical directivity index.

2. The method of claim 1 further comprising the step of increasing the accuracy of the sensor array and increasing the actual directivity index by providing weights for elements in the sensor array.

3. The method of claim 1 further comprising the steps of:
examining array element determinations and relationships between array elements and hardware components from the configured software to find patterns;
diagnosing a non-operative hardware component by examining the patterns found in the step of examining array element determinations; and
providing a display indicating the diagnosed non-operative hardware component.

4. The method of claim 1 further comprising the steps of:
accepting user input proposing a non-operative hardware component;
utilizing the proposed non-operative hardware component with the database to identify related array elements that appear as non-operative when the proposed hardware component is non-operative; and
comparing the identified related array elements with at least one of the first chart display and the additional chart displays to determine if the proposed non-operative hardware component is a likely cause of the resulting compared display.

5. The method of claim 1 wherein:
said array elements comprise:
a plurality of fiber optic lines; and
a plurality of interferometric sensors formed in said plurality of fiber optic lines;
said hardware components comprise:
a plurality of lasers operating at different frequencies, and joined to provide light to said plurality of fiber optic lines, and further being associated with individual array elements on different ones of said plurality of fiber optic lines;
a plurality of processing cards each being joined to receive signals from at least one of said plurality of fiber optic lines; and
at least one chassis, each chassis joined to several of said plurality of processing cards for consolidating signals from said cards.

6. A system comprising:
a sensor array with a plurality of array elements;
a plurality of hardware components joined to said sensor array;
software configured with relationships among said plurality of hardware components and said plurality of array elements; and
a computer capable of executing said software, said plurality of hardware components and a display, said computer being configured to generate at least one chart display that includes data with respect to whether the plurality of array elements and hardware components are operational on an average basis for a time frame of interest, said chart display also capable of showing the relationships from said software and illustrating patterns of non-operational array elements;
wherein said computer is configured to:
calculate an actual directivity index for the sensor array based on a ratio of the number of operative array elements to the number of in-operative elements and based on weights associated with the operative elements and in-operative elements;
specify a theoretical directivity index for the sensor array as a highest possible actual directivity index; and
determine an accuracy of the sensor array based on the difference between the actual directivity index and the theoretical directivity index.

7. The system of claim 6 wherein said computer is configured to identify patterns of non-operational array elements and provide a display of a proposed diagnosis indicating which of said plurality of hardware components has failed.

8. A system comprising:
a sensor array with a plurality of array elements;
a plurality of hardware components joined to said sensor array;
software configured with relationships among said plurality of hardware components and said plurality of array elements; and
a computer capable of executing said software, said plurality of hardware components and a display, said computer being configured to generate at least one chart display that includes data with respect to whether the plurality of array elements and hardware components are operational on an average basis for a time frame of interest, said chart display also capable of showing the relationships from said software and illustrating patterns of non-operational array elements;
wherein:
said array elements comprise:
a plurality of fiber optic lines; and
a plurality of interferometric sensors formed in said plurality of fiber optic lines;
said hardware components comprise:
a plurality of lasers operating at different frequencies, and joined to provide light to said plurality of fiber optic lines, and further being associated with individual array elements on different ones of said plurality of fiber optic lines;
a plurality of processing cards each being joined to receive signals from at least one of said plurality of fiber optic lines; and
at least one chassis, each chassis joined to several of said plurality of processing cards for consolidating signals from said cards.

* * * * *